United States Patent
Ma et al.

(10) Patent No.: US 7,760,773 B2
(45) Date of Patent: Jul. 20, 2010

(54) WAVELENGTH CONVERSION LASER APPARATUS

(75) Inventors: Byung Jin Ma, Gyunggi-do (KR); Kiyoyuki Kawai, Gyunggi-do (KR); Hong Ki Kim, Gyunggi-do (KR)

(73) Assignee: Samsung LED Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/976,790

(22) Filed: Oct. 29, 2007

(65) Prior Publication Data

US 2008/0107141 A1    May 8, 2008

(30) Foreign Application Priority Data

Nov. 3, 2006    (KR)    ............... 10-2006-0108552

(51) Int. Cl.
*H01S 3/10*    (2006.01)
(52) U.S. Cl. .................................. 372/21; 372/20
(58) Field of Classification Search ............ 372/20, 372/21; 359/333, 332; 385/122
See application file for complete search history.

(56) References Cited

U.S. PATENT DOCUMENTS

| | | | | |
|---|---|---|---|---|
| 5,159,487 A | * | 10/1992 | Geiger et al. | ............... 359/330 |
| 5,615,041 A | * | 3/1997 | Field et al. | ................... 359/326 |
| 5,785,041 A | * | 7/1998 | Weinstein et al. | ........... 600/407 |
| 5,999,547 A | * | 12/1999 | Schneider et al. | ............. 372/21 |
| 6,058,126 A | * | 5/2000 | Ishikawa et al. | ............... 372/75 |
| 6,229,828 B1 | * | 5/2001 | Sanders et al. | ................ 372/22 |
| 6,304,585 B1 | * | 10/2001 | Sanders et al. | ................ 372/22 |
| 6,785,041 B1 | | 8/2004 | Vodopyanov | |
| 6,795,232 B2 | * | 9/2004 | Fujiura et al. | ............... 359/326 |
| 2006/0109542 A1 | * | 5/2006 | Mizuuchi et al. | ............ 359/330 |

* cited by examiner

*Primary Examiner*—Minsun Harvey
*Assistant Examiner*—Tuan N. Nguyen
(74) *Attorney, Agent, or Firm*—McDermott, Will & Emery LLP

(57) ABSTRACT

A wavelength conversion laser apparatus including: a laser light source emitting primary wavelength light; a non-linear optical crystal including: a light waveguide region having a first refractivity, the light waveguide region receiving the primary wavelength light to output as secondary wavelength light; and a clad region adjacent to the light waveguide region, the clad region having a second refractivity lower than the first refractivity, wherein at least the light waveguide region has a periodically domain-inverted structure formed such that a domain-inverted period varies in a direction perpendicular to an incident axis of the primary wavelength light; and a mover moving the non-linear optical crystal to change the domain-inverted period on a path where the primary wavelength light incident on the light waveguide region passes.

8 Claims, 3 Drawing Sheets

WAVELENGTH CONVERSION LASER APPARATUS

CROSS-REFERENCE TO RELATED APPLICATIONS

This application claims the priority of Korean Patent Application No. 2006-108552 filed on Nov. 3, 2006, in the Korean Intellectual Property Office, the disclosure of which is incorporated herein by reference.

BACKGROUND OF THE INVENTION

1. Field of the Invention

The present invention relates to a wavelength conversion laser device, more particularly, which achieves high wavelength conversion efficiency and increases an operating temperature range.

2. Description of the Related Art

Recently, a variety of displays and optical recording devices have seen an increasing demand for semiconductor lasers. Especially, as a semiconductor laser finds its application broadened to implement full-color in displays, there is a greater demand for a laser which exhibits low-power characteristics, and high-power capability in a visible light region.

To obtain red light, an AlGaInP or AlGaAs-based semiconductor laser can be manufactured relatively easily. On the other hand, in a process for producing green or blue light, a group III nitride semiconductor is much harder to grow than other semiconductor materials due to a unique lattice constant and thermal expansion coefficient thereof. Besides, the group III nitride semiconductor demonstrates high density of crystal defects such as dislocation, thereby undermining reliability of the laser and shortening a useful life thereof.

To solve this problem, non-linear characteristics are used to convert a wavelength. As one of methods for utilizing such non-linear characteristics, a diode-pumped solid-state laser (DPSS) has drawn attention. For example, a pump laser diode light with a wavelength of 808 nm is made incident on a crystal such as Nd:YAG to obtain a wavelength of around 1060 nm. Then the wavelength of 1060 nm is doubled in frequency using the non-linear optical crystal to produce green light with a wavelength of around 530 nm.

To date, studies on a green light source have been chiefly directed at enhancing wavelength conversion efficiency. However, to increase wavelength conversion efficiency of the non-linear optical crystal, a temperature should be regulated precisely. To assure such precise temperature control, a thermo-electric cooler (TEC) formed of a Peltier device is required, which however may significantly add to power consumption and size of the device.

Therefore, in the art, a small-sized green laser needs to achieve high wavelength conversion efficiency and a broader operating temperature range to be applicable to a portable small projector or mobile phone.

SUMMARY OF THE INVENTION

An aspect of the present invention provides a wavelength conversion laser device which employs periodically domain-inverted patterns and a light waveguide structure to ensure a broader operating temperature range and high optical conversion efficiency.

An aspect of the present invention also provides a wavelength conversion laser apparatus including: a laser light source emitting primary wavelength light; a non-linear optical crystal including: a light waveguide region having a first refractivity, the light waveguide region receiving the primary wavelength light to output as secondary wavelength light; and a clad region adjacent to the light waveguide region, the clad region having a second refractivity lower than the first refractivity, wherein at least the light waveguide region has a periodically domain-inverted structure formed such that a domain-inverted period varies in a direction perpendicular to an incident axis of the primary wavelength light; and a mover moving the non-linear optical crystal to change the domain-inverted period on a path where the primary wavelength light incident on the light waveguide region passes.

The periodically domain-inverted structure may be formed of a fan-shaped domain-inverted pattern. Accordingly, with the primary wavelength light shifted in an incident position thereof, a domain-inverted period may change successively.

The periodically domain-inverted structure may be formed across the non-linear optical crystal. The mover may move the non-linear optical crystal in a width direction thereof.

The wavelength conversion laser apparatus may further include: a detector disposed at an output side of the non-linear optical crystal to detect intensity of the secondary wavelength light; and a movement controller controlling the mover to move the non-linear optical crystal to a position corresponding to the domain-inverted period for maintaining maximum conversion efficiency, according to a detected result. This allows detection of a change in wavelength conversion efficiency induced by a change in external environment such as temperature, thereby automatically shifting an incident position of the primary wavelength light to the domain-inverted pattern having a suitable period.

The non-linear optical crystal may be formed of at least one of $KTiOPO_4$, $LiTaO_3$ and $LiNbO_3$.

The wavelength conversion laser apparatus may further include a resonator increasing an output of the secondary wavelength light. The resonator may include: a first mirror disposed between the laser light source and the non-linear optical crystal, the first mirror having high reflectivity for the secondary wavelength light and non-reflectivity for the primary wavelength light; and a second mirror disposed at an output side of the non-linear optical crystal, the second mirror having high reflectivity for the secondary wavelength light in a range lower than reflectivity of the first mirror.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
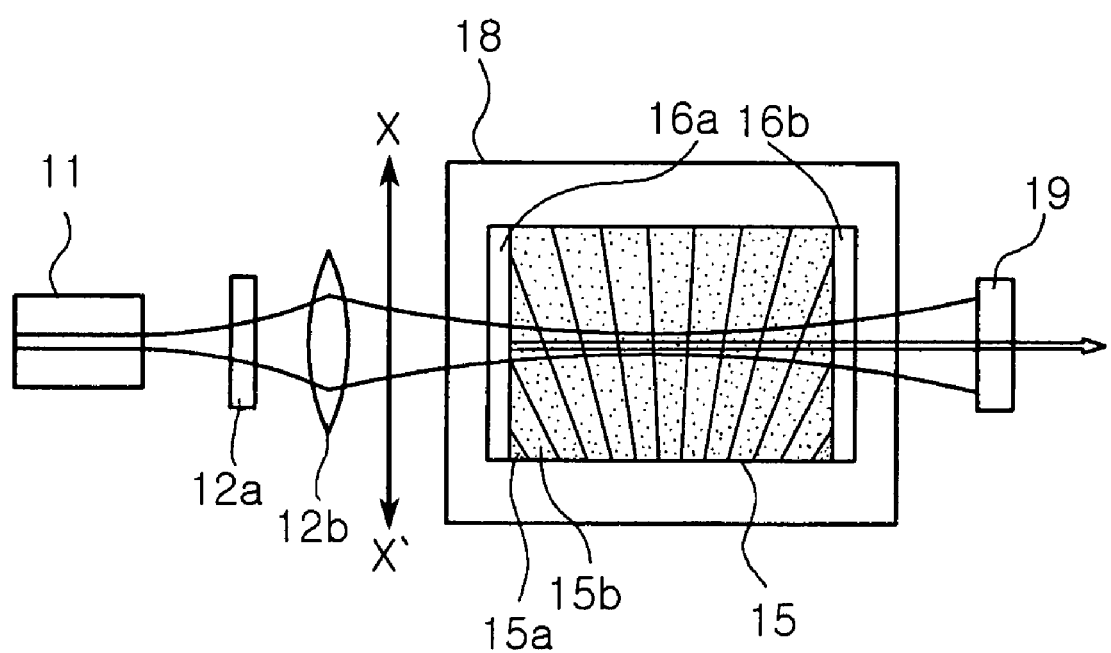
FIG. 1 is a schematic configuration view illustrating a wavelength conversion laser apparatus according to an exemplary embodiment of the invention.
Figure 2:
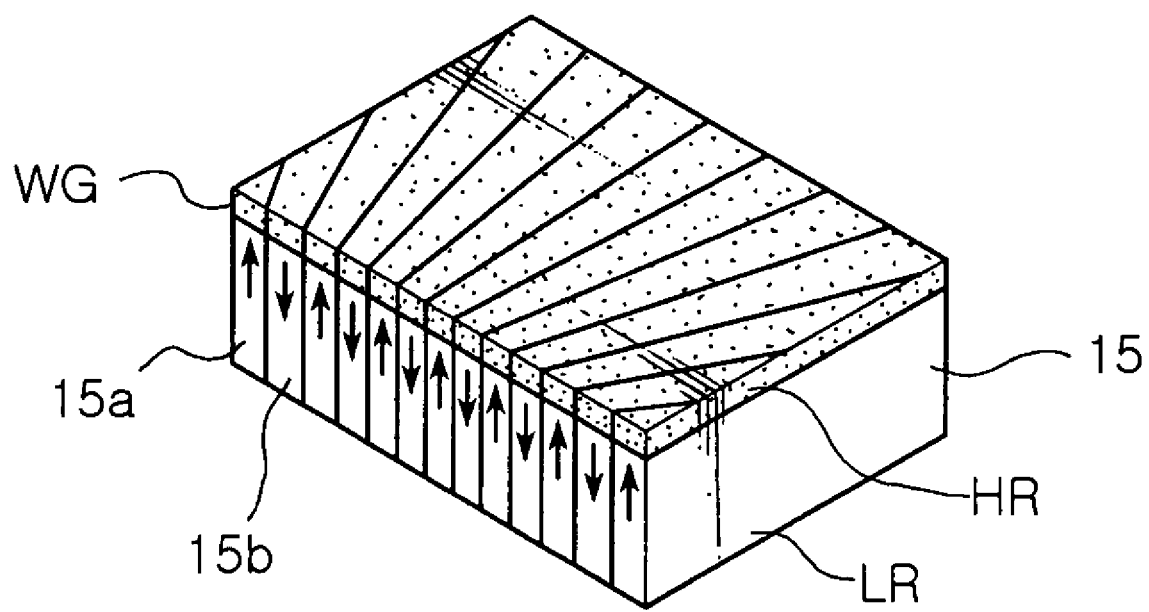
FIG. 2 is a perspective view illustrating a non-linear optical crystal employed in the wavelength conversion laser apparatus shown in FIG. 1.

FIG. 1 is a schematic configuration view illustrating a wavelength conversion laser apparatus according to an exemplary embodiment of the invention and FIG. 2 is a perspective view illustrating a non-linear optical crystal 15 employed in the wavelength conversion laser apparatus shown in FIG. 1.

The wavelength conversion laser apparatus shown in FIG. 1 includes a laser light source 11 and a non-linear optical crystal 15 converting primary wavelength light of the laser light source 11 into desired primary wavelength light.

The non-linear optical crystal 15 may be formed of one of KTiOPO$_4$ (KTP), LiTaO$_3$ and LiNbO$_3$. As in the present embodiment, the wavelength conversion laser apparatus may additionally include a resonator defined by first and second mirrors 16a and 16b to thereby boost wavelength conversion efficiency. The first mirror 16a formed at an input side of the non-linear optical crystal 15 has high reflectivity for secondary wavelength light and non-reflectivity for the primary wavelength light. The second mirror 16b formed at an output side of the non-linear optical crystal 15 has high reflectivity for the secondary wavelength light in a range lower than reflectivity of the first mirror.

In the present embodiment, the first and second mirrors 16a and 16b defining the resonator are formed at the input and output sides of the non-linear optical crystal 15. Alternatively, the first mirror 16a may be provided at an arbitrary position between the laser light source 11 and the non-linear optical crystal 15 and the second mirror 16b may be provided at an arbitrary position of an output side of the non-linear optical crystal 15. Also, an optical filter 19 such as a spectroscoptic filter may be further disposed at the output side of the non-linear optical crystal 15 to output desired secondary wavelength light.

"The non-linear optical crystal 15, as shown in FIG. 2, may include a light waveguide region WG and a clad region. The light guide wave region WG receives the primary wavelength light of the laser light source to output as the secondary wavelength light. To precisely adjust an incident position of the primary wavelength light, the wavelength conversion laser apparatus of the present embodiment may further include a light collector such as first and second lenses between the laser light source 11 and the non-linear optical crystal."

"The light waveguide region WG is a high refractivity area HR having a first refractivity and the clad region is a low refractivity area LR having a second refractivity. A difference in refractivity between the light waveguide region WG and the clad region allows light propagating through the light waveguide region WG to maintain high density, thereby effectively enhancing wavelength conversion efficiency."

As shown in FIG. 2, the light waveguide region WG may feature a one-dimensional slab-shaped waveguide structure formed on a top of the non-linear optical crystal 15 in a direction perpendicular to an incident axis of the light. In general, the high refractivity area HR defining the light waveguide region WG is formed by doping appropriate dopants. Therefore, for procedural convenience, the high refractivity area may be formed on one surface of the non-linear optical crystal 15 to include the incident axis of the light as in the present embodiment.

Moreover, the non-linear optical crystal 15 of the present embodiment has periodically domain-inverted patterns 15a and 15b. The periodically domain-inverted patterns 15a and 15b are structured such that a domain-inverted period is changed according to a path where the light passes. To form these periodically domain-inverted patterns 15a and 15b, a high voltage may be selectively applied to produce domain inversion by a known art. Considering this formation process of the periodically domain-inverted patterns 15a and 15b as described above, the non-linear optical crystal 15 itself may be structurally formed of the periodically domain-inverted patterns.

Notably, the periodically domain-inverted patterns 15a and 15b may have a period changed according to an incident position of light to thereby realize a wavelength-tuning wavelength converter. According to the present embodiment, the wavelength is tunable according to a change in the period of the domain-inverted patterns 15a and 15b, adequately varying a maximum phase-matched wavelength according to a change in external environment such as temperature.

The non-linear optical crystal 15 may have fan-shaped, periodically domain-inverted patterns as in the present embodiment. The fan-shaped, periodically domain-inverted patterns 15a and 15b are structured such that a domain-inverted period is changed in succession in an x-x' direction, thereby appropriately tuning a maximum phase-matched wavelength.

To change the domain-inverted period, the light propagating through the non-linear optical crystal 15 may be changed in its path by a mover 18 for moving the non-linear optical crystal 15 as shown in FIG. 1. The mover 18 may be configured variously but formed of a moving stage having the non-linear optical crystal 15 disposed on a top thereof. This moving stage may serve as a heat sink for the non-linear optical crystal 15, thereby further minimizing the wavelength conversion laser apparatus.

As described above, according to the present embodiment, the bulk-type, non-linear optical crystal employs the fan-shaped, periodically domain-inverted patterns. Accordingly, a wavelength is tunable according to a change in the period of the domain-inverted patterns to thereby ensure maximum phase matching. Also, the non-linear optical crystal adopting the light waveguide region is increased in density of the light, considerably enhancing wavelength conversion efficiency.

Figure 3A:
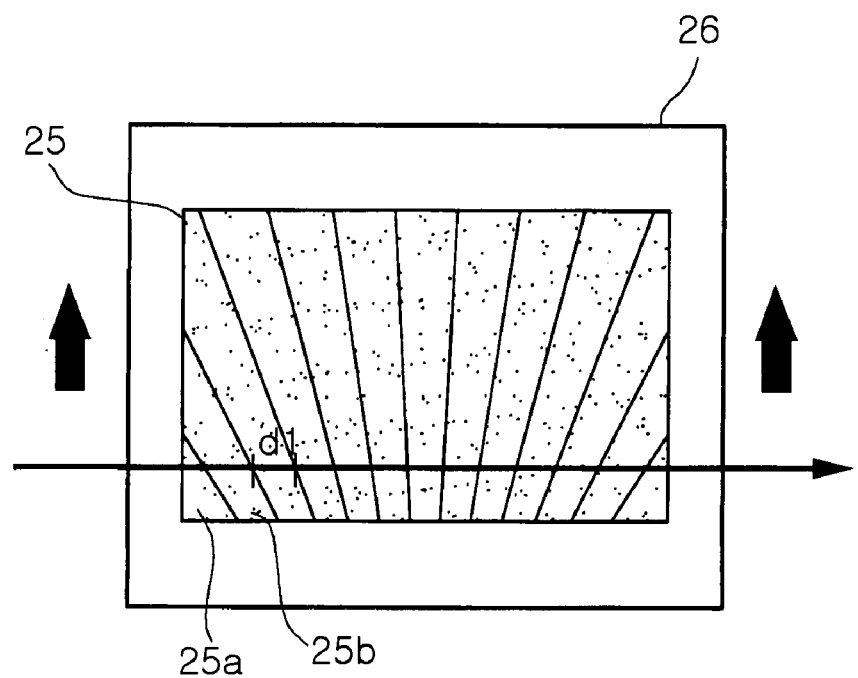
FIGS. 3A and 3B are schematic views for explaining a domain-inverted period on an optical path according to positional movement of a fan-shaped, periodically domain-inverted non-linear crystal.
Figure 3B:
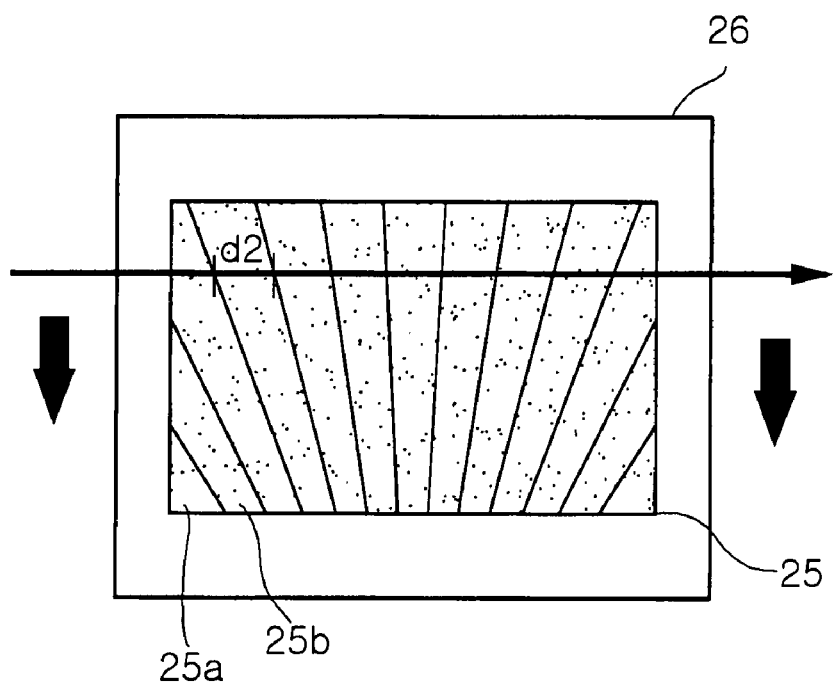

FIGS. 3A and 3B are schematic views for explaining a change in a domain-inverted period on an optical path according to positional movement of a fan-shaped, periodically domain-inverted non-linear optical crystal. The non-linear optical crystal 25 shown in FIGS. 3A and 3B is understood to move in a direction indicated with vertical arrows.

For example, in a case where with increase in temperature, the non-linear optical crystal 25 is increased in refractivity, mismatched in phase with incident light, and then decreased in wavelength conversion efficiency, as shown in FIG. 3A, the moving stage 26 moves along the vertical arrows, thereby reducing a period d1 of the domain-inverted patterns 25a and 25b over a period when the light passes through a center of the non-linear optical crystal 25. Here, the phase matching condition for maximum wavelength conversion efficiency is shifted to a wavelength longer than a wavelength of incident light. However, the phase matching condition is maintained at the wavelength of the incident light by moving the non-linear optical crystal by the moving stage.

On the other hand, in a case where with decrease in temperature, the non-linear optical crystal 25 is increased in refractivity, mismatched in phase with incident light, and then decreased in wavelength conversion efficiency, as shown in FIG. 3B, the moving stage 26 moves along the vertical arrows, thereby increasing a period d2, d2>d1 of the domain-inverted patterns 25a and 26b over a period when the light passes through a center of the non-linear optical crystal 25. Here, the phase matching condition for maximum wavelength conversion efficiency is shifted to a wavelength shorter than a wavelength of incident light. However, the phase matching condition is maintained at the wavelength of the incident light by moving the non-linear crystal by the moving stage.

A wavelength conversion device may experience phase mismatch when a wavelength of a laser beam is altered by a current injected from a laser light source or light output, or an ambient temperature is changed, thereby deteriorated in wavelength conversion efficiency. As described above, this problem can be overcome by manufacturing a non-linear optical crystal having domain-inverted patterns with a period varied in a direction perpendicular to incident light. Here, the non-linear optical crystal may be moved to change a period of the domain-inverted patterns on a path where the primary wavelength light incident passes. This changes a maximum phase-matched wavelength to ensure high wavelength conversion efficiency.

Also, as described above, the light waveguide region is formed as a slab structure in the bulk-type non-linear optical crystal along an area where a period of the domain-inverted patterns is changed. Consequently, the non-linear optical crystal is increased in density of light, further improving wavelength conversion efficiency.

According to the present embodiment, to more stably ensure higher wavelength conversion efficiency resulting from a change in the domain-inverted patterns, efficiency of the secondary wavelength light outputted is appropriately fed back to control movement of the mover so that incident light passes the domain-inverted patterns with a desired period. That is, the detector may be further disposed at an output side of the non-linear optical crystal to detect intensity of the secondary wavelength light and a movement controller may be further disposed to control the mover of the non-linear optical crystal to move to the domain-inverted period enabling the maximum conversion efficiency to be maintained, according to the detected result.

According to the present embodiment, a change in wavelength conversion efficiency resulting from a change in external environment such as temperature is detected to effectively adjust an incident position of the primary wavelength light to the domain-inverted patterns with an appropriate period.

As set forth above, according to exemplary embodiments of the invention, in a wavelength conversion laser device, a one-dimensional light waveguide region is formed in a bulk-type non-linear optical crystal and periodically domain-inverted patterns are formed on the light waveguide region. This assures high light density to be maintained and allows light to be controlled in its path to be tuned to an optimum phase-matched wavelength. This accordingly produces a wavelength conversion laser apparatus ensuring a broader driving temperature range and higher optical conversion efficiency.

While the present invention has been shown and described in connection with the exemplary embodiments, it will be apparent to those skilled in the art that modifications and variations can be made without departing from the spirit and scope of the invention as defined by the appended claims.

What is claimed is:

1. A wavelength conversion laser apparatus comprising: a laser light source emitting primary wavelength light; a non-linear optical crystal comprising: a light waveguide region having a first refractivity, the light waveguide region receiving the primary wavelength light to output as secondary wavelength light; and a clad region adjacent to the light waveguide region, the clad region having a second refractivity lower than the first refractivity, wherein at least the light waveguide region has a periodically domain-inverted structure formed such that a domain-inverted period varies in a direction perpendicular to an incident axis of the primary wavelength light; and a mover moving the non-linear optical crystal to change the domain-inverted period on a path where the primary wavelength light incident on the light waveguide region passes; and the light waveguide region has an one-dimensional slab-shaped waveguide structure formed on a top of the non-linear optical crystal; where a detector disposed at an output side of the non-linear optical crystal to detect intensity of the secondary wavelength light; and a movement controller controlling the mover to move the non-linear optical crystal to a position corresponding to the domain-inverted period for maintaining maximum conversion efficiency, according to a detected result.

2. The wavelength conversion laser apparatus of claim 1, wherein the periodically domain-inverted structure is formed of a fan-shaped domain-inverted pattern.

3. The wavelength conversion laser apparatus of claim 1, wherein the periodically domain-inverted structure is formed across the non-linear optical crystal.

4. The wavelength conversion laser apparatus of claim 1, wherein the mover moves the non-linear optical crystal in a width direction thereof.

5. The wavelength conversion laser apparatus of claim 1, wherein the non-linear optical crystal is formed of at least one of $KTiOPO_4$, $LiTaO_3$ and $LiNbO_3$.

6. The wavelength conversion laser apparatus of claim 1, further comprising a resonator increasing an output of the secondary wavelength light.

7. The wavelength conversion laser apparatus of claim 6, wherein the resonator comprises:
    a first mirror disposed between the laser light source and the non-linear optical crystal, the first mirror having high reflectivity for the secondary wavelength light and non-reflectivity for the primary wavelength light; and
    a second mirror disposed at an output side of the non-linear optical crystal, the second mirror having high reflectivity for the secondary wavelength light in a range lower than reflectivity of the first mirror.

8. The wavelength conversion laser apparatus of claim 1, wherein the light waveguide region is formed in a direction perpendicular to an incident axis of the light.

* * * * *